United States Patent [19]

Satoh et al.

[11] 4,124,873
[45] Nov. 7, 1978

[54] ELECTRIC DEVICE FOR USE IN A TRANSCRIBER

[75] Inventors: Ken Satoh; Tuneo Yanagida, both of Hachioji, Japan

[73] Assignee: Olympus Optical Co., Ltd., Tokyo, Japan

[21] Appl. No.: 707,992

[22] Filed: Jul. 23, 1976

[30] Foreign Application Priority Data

Jul. 24, 1975 [JP] Japan .................... 50-102789[U]

[51] Int. Cl.$^2$ ................ G11B 15/18; G11B 15/48; G11B 15/02; G11B 19/02

[52] U.S. Cl. ................ 360/74; 179/100.1 DR; 360/62; 360/73; 360/90

[58] Field of Search .......... 360/74, 73, 71, 62, 360/69, 90; 179/100.1 DR; 318/305, 202, 55

[56] References Cited

U.S. PATENT DOCUMENTS

| | | | |
|---|---|---|---|
| 3,348,113 | 10/1967 | Vichr | 318/305 |
| 3,711,657 | 1/1973 | Niioka | 360/71 |
| 3,813,691 | 5/1974 | Emmert | 360/74 |
| 3,952,330 | 4/1976 | Rimkus et al. | 360/74 |
| 3,995,314 | 11/1976 | Jacobson | 360/74 |
| 4,007,491 | 2/1977 | Bolick, Jr. | 360/74 |
| 4,032,983 | 6/1977 | Sato | 179/100.1 DR |

*Primary Examiner*—Alfred H. Eddleman

[57] ABSTRACT

An electric device for use in a transcriber comprising a main switch turned on or off in interlocking relation with a mechanism for setting to a position ready for operation a magnetic tape feed means and a magnetic tape reproduction means of a transcriber, a circuit for rewinding a magnetic tape at a specified speed including a first manually operable change-over switch and a tape rewinding solenoid for keeping the magnetic tape feed means at the rewinding position, a circuit for permitting the magnetic tape to undergo a high speed travel, including a second manually operable switch and energized in response to the operation of the second manually operable switch, a backspace circuit including a third changeover switch driven by the first foot pedal and intended to energize the tape rewinding solenoid in response to the operation of the third change-over switch to rewind the magnetic tape at a speed lower than that at the time of the rewinding and high speed travelling operation, a motor speed control circuit energized by a fourth change-over switch driven by the second foot pedal to permit the tape to travel at the specified speed, and a playback circuit including a playback solenoid for moving the magnetic tape feed means and magnetic tape reproduction means to a reproduction position from a position ready for operation to keep them at their respective playback positions.

6 Claims, 9 Drawing Figures

FIG. 7

ELECTRIC DEVICE FOR USE IN A TRANSCRIBER

BACKGROUND OF THE INVENTION

This invention relates to an electric device for use in a transcriber, so constructed that at least the playback operation may be carried out by a foot pedal.

Generally known as a transcriber is a device for exclusive use in magnetically recorded sound reproduction, which is so designed that a magnetically recorded tape may be reproduced and a typist may typewrite while hearing the reproduced sounds. Upon typewriting, the typist uses her hands for the typewriting operation and therefore at least the playback operation of the transcriber should be controlled by a switch driven by the foot pedal. Further, the transcriber should have a function called "backspace" to rewind the tape up to a desired position at a low speed, in addition to the functions, i.e., rewinding, high speed travelling and playback functions that an ordinary tape recorder for exclusive use in reproduction has. This backspace operation is usually performed by operation of the foot pedal. In this way, the transcriber has its electric device made considerably complicated as compared with that of an ordinary tape recorder for exclusive use in reproduction.

On the other hand, a magnetic tape recorder has made a rapid advancement after a "cassette tape" came into existence, followed by an increase in the demand for the transcriber using the "cassette tape". Especially a compact match box-sized microcassette tape exploited by the present inventors, owing to its microcassette recorder being also made very compact, is convenient to carry and has therefore come to be widely used. Accordingly, there is a growing demand to put into practical use the transcriber using such a compact-sized microcassette.

SUMMARY OF THE INVENTION

Accordingly, the object of the invention is to provide an electric device for use in a transcriber which is simple in construction and easy to operate.

According to the invention, there is obtained an electric device for use in a transcriber comprising a main switch turned on or off in interlocking relation with a mechanism for setting to a position ready for operation a magnetic tape feed means and a magnetic tape reproduction means of a transcriber, a circuit for rewinding a magnetic tape at a specified speed including a tape rewinding solenoid for moving said magnetic tape feed means to a rewinding position from the position ready for operation to keep said magnetic tape feed means at said rewinding position, a circuit for permitting said magnetic tape to undergo a high speed travel by driving said magnetic tape feed means kept in said position ready for operation, a backspace circuit for energizing said tape rewinding solenoid to drive said magnetic tape feed means of a speed lower than that at the time of said rewinding and high speed travelling operation, and a playback circuit including a playback solenoid for moving said magnetic tape feed means and magnetic tape reproduction means to a playback position from the position ready for operation to keep tham of their respective playback positions.

DETAILED DESCRIPTION OF THE INVENTION

Figure 1:
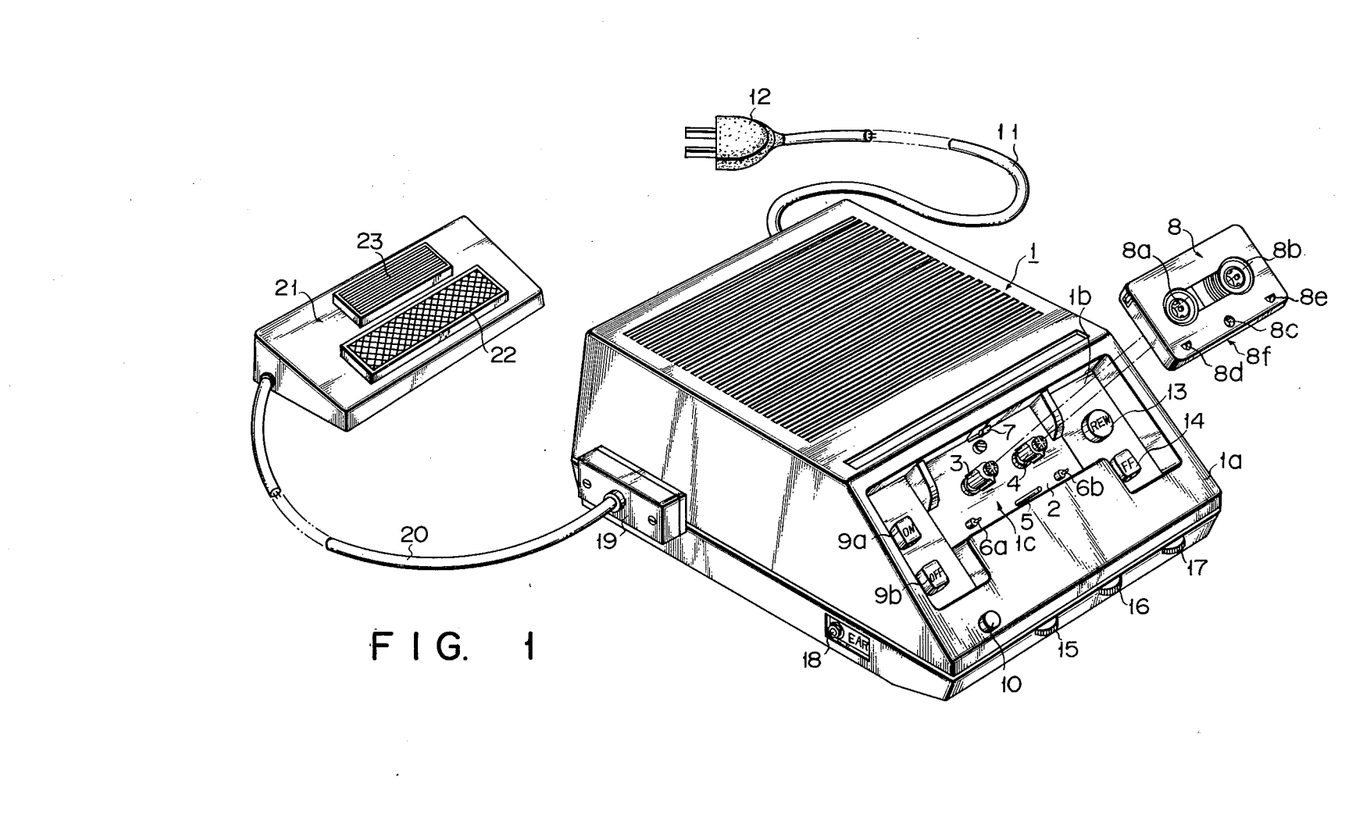
FIG. 1 is a perspective view showing an example of a transcriber to which the invention is applied.

FIG. 1 is a perspective view showing a transcriber 1 to which this invention is applied. The transcriber 1 is constructed such that a front upper face thereof takes the form of an inclined face section 1a which is downwardly inclined toward the operator; in this inclined face section 1a an inverted U-shaped concave section 1b is formed; and in this concave section 1b a cassette-installing section 1c and an operation button-disposing section are provided. Namely, the central part of the concave section 1b constitutes the cassette-installing section 1c. Within the cassette-installing section 1c are disposed a tape winding shaft 3, tape rewinding shaft (tape feeder shaft) 4, capstan 5, and cassette-positioning pins 6a, 6b passed through a dressing plate 2, and a cassette-positioning spring 7. On the cassette-installing section 1c having such members disposed therein is detachably installed a tape microcassette 8. This micro tape cassette 8 is a one which is exploited by the present inventors and in which a magnetic tape is received, as well known, within a cassette formed into a compact match box-size. Namely, at both right and left ends of a central part of the cassette are rotatably disposed tape hubs 8a, 8b, to which are fixed both ends of the tape, respectively. The tape, thereafter, is wound around one tape hub 8b and part thereof is tensioned along an elongate window aperture of a front face section 8f.

At that middle portion of the cassette 8 which is located on the rear side of the tape tensioned along the window aperture is provided a capstan-inserting aperture 8c, and at those right and left portions of the aperture 8c which are biased toward the right and left ends of the cassette 8, respectively, are provided cassette-positioning apertures 8d and 8e.

When the micro tape cassette 8 is installed on the dressing plate 2 by fitting the tape hubs 8a, 8b, the capstan-inserting aperture 8c, and the cassette-positioning apertures 8d, 8e over the tape winding shaft 3 and rewinding shaft 4 of the cassette-installing section 1c, the capstan 5, and the cassette-positioning pins 6a, 6b, respectively, the rear face of the cassette is pressed by the cassette-positioning spring 7, whereby the cassette is installed at a prescribed position of the cassette-installing section 1c. Thus, the micro tape cassette 8 is detachably installed inclined with respect to the transcriber 1.

Within a concave section located leftwardly (FIG. 1) of the cassette-installing section 1c are disposed on and off operation buttons 9a, 9b of a main switch. The on and off operation buttons 9a, 9b are designed to operate a seesaw type on-off operation member (not shown) to turn the main switch on or off, whereby when the operation button 9a is depressed, the main switch S (see FIG. 2) is turned on and when the operation button 9b is depressed, the main switch S is turned off. When the main switch S is turned on, a power lamp 10 is lit to display that a power source is connected to the transcriber 1. Namely, a power cord 11 led out from the rear face of the transcriber 1 is connected to a commercially used power source through a plug 12, and when the on-operation button 9a is depressed, the power lamp 10 is lit.

Within a concave section located rightwardly (FIG. 1) of the cassette-installing section 1c are disposed a tape rewinding operation button 13 and a tape high speed travel operation button 14. Upon depression of the operation button 13, the tape rewinding operation changing-over switch as later described is changed over, while upon depression of the operation button 14, a tape high speed changing-over switch as later described is changed over.

On the front face section of the transcriber 1 connected directly to the above-mentioned inclined face section 1a are exposed part of a sound quantity controlling knob 15, part of a sound quality controlling knob 16, and part of a tape travel speed controlling knob 17. Besides, at a forwardly biased position of the left side face (FIG. 1) of the transcriber 1 is provided an earphone jack 18, and at a rearwardly biased position thereof is provided a plug 19 to which is connected a foot switch box 21 through a conductive cord 20. Within the foot switch box 21 are received a playback switch and a backspace switch as later described. When one foot pedal 22 is depressed, the playback switch is changed over to its operative side to permit the transcriber 1 to be brought to a condition ready for reproduction. When the other foot pedal 23 is depressed, the backspace switch is changed over to its operative side to permit the tape to be rewound during this depression.

The transcriber 1 to which this invention is applied has the foregoing outside construction.

Hereinafter, description is made of an electric circuit applied to the transcriber 1 having said construction.

Figure 2:
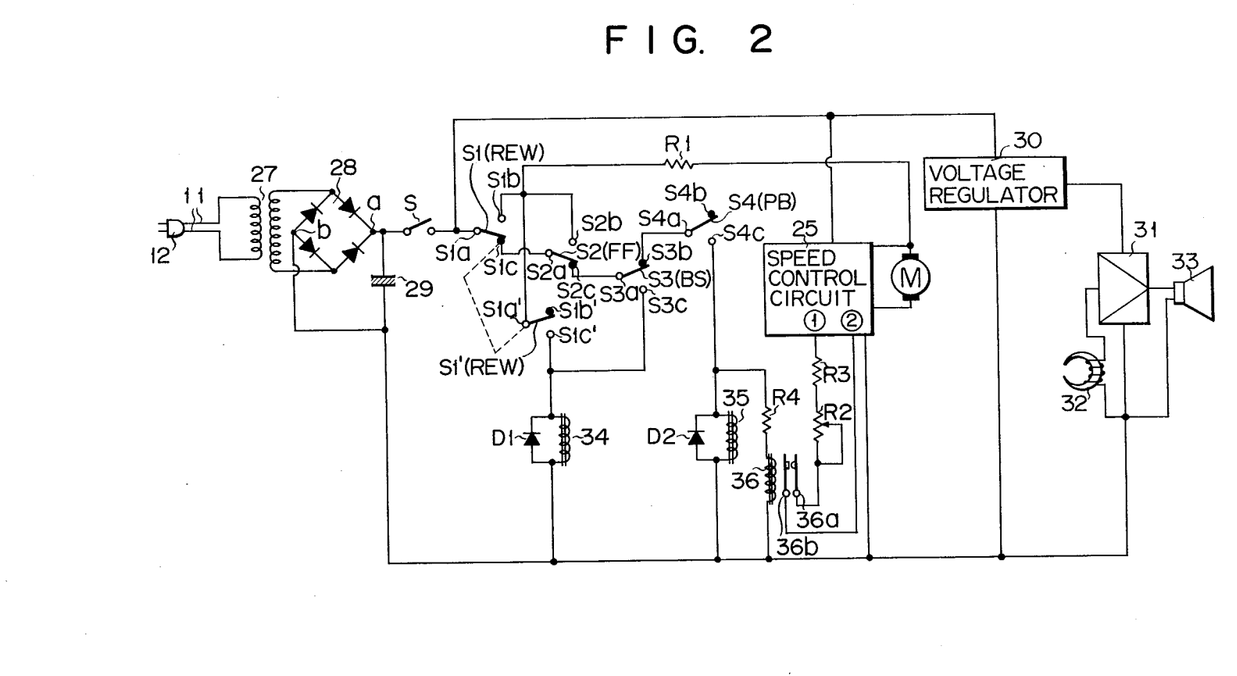
FIG. 2 is a circuit diagram showing the electric device according to an embodiment of the invention.

First, an example of the present electric circuit shown in FIG. 2 is so constructed that when the tape rewinding is performed by depressing the tape rewinding operation button 13 (FIG. 1) and when the high speed travel or feed of the tape is carried out by depressing the tape high speed travel operation button 14, the electric circuit may directly cause a motor M to make a high speed rotation without operating a motor speed control circuit 25, for example, at a speed 1.5 to 3 times the ordinary reproduction speed of the tape.

Figure 8:
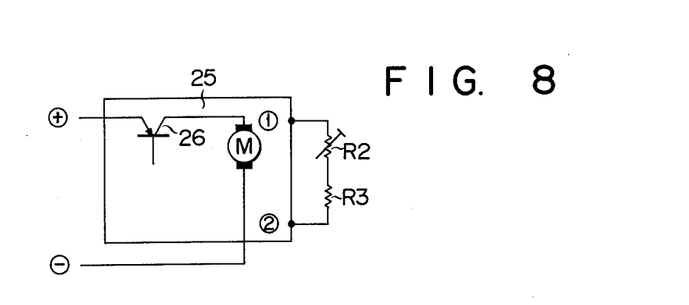
FIG. 8 is a circuit diagram showing an example of a motor speed control circuit.

The above-mentioned motor speed control circuit 25 usually has a control transistor 26 connected, as shown in FIG. 8, to a plus side of the power source, said motor M being connected to an output (collector) side of the transistor 26. The circuit 25 is so designed that the rotation speed of the motor M can be determined as required by varying the resistance value of resistors R2 and R3 connected between the control terminals 1 and 2, and that even when torque variation occurs during the rotation at said determined speed, a specified rotational speed may be maintained by the action of the control circuit.

Accordingly, the motor speed control circuit 25 playing the above-mentioned role, where incorporated in the electric circuit of FIG. 2, is so arranged as to control the rotation speed of the motor M at the time of normal reproduction of the tape, or only at the time of playback for reproducing the tape at a rated speed.

Referring to FIG. 2, the power cord 11 having the power plug 12 connected thereto is connected to a primary side of a power transformer 27. A secondary side of this transformer 27 is connected to an input end of an all-wave rectifier circuit 28, output ends $a$, $b$ of which are connected across a smoothing condenser 29 and connected to a constant voltage circuit 30 and said motor speed control circuit 25 through the main switch S.

An output voltage of the constant voltage circuit 30 is supplied to an amplifier circuit 31. The amplifier circuit 31, as well known, is adapted to amplify the reproduction output of a reproducing magnetic head 32 to supply its reproduction output to a loud-speaker 33.

To one output end $a$ of the rectifier circuit 28 is connected a movable contact piece terminal S1a of the tape rewinding operation change-over switch S1 through the main switch S. The change-over switch S1 is constructed into an interlocking switch pair S1 and S1', and a movable contact piece terminal S1a' of the switch S1' is connected to one stationary terminal S1b of the switch S1. A movable contact piece of the switch S1 is normally kept changed over to the other stationary terminal S1c, while a movble contact piece of the switch S1' is normally kept changed over to a stationary terminal S1b'. The stationary terminal S1c is connected to a movable contact piece terminal S2a of a tape high speed travel change-over switch S2, and one stationary terminal S2b of the switch S2 is connected to the stationary terminal S1b. The stationary terminal S1b is connected directly to one end of the motor M through a resistor R1. The other stationary terminal S2c of the switch S2 is connected to a movable contact piece terminal S3a of a foot switch S3 adapted to be changed over by the foot pedal 23 (see FIG. 1) for the backspace operation, the other stationary terminal S3c of the switch S3 being connected to the other stationary terminal S1c' of the switch S1'. Between this stationary terminal S1c' and the other output end $b$ of the rectifier circuit 28 is connected a tape rewinding backspace solenoid 34. One stationary terminal S3b of the switch S3 is connected to a movable contact piece terminal S4a of a foot switch S4 adapted to be changed over by a playback foot pedal 22 (see FIG. 1).

The foot switch S4 has its movable contact piece normally allowed to contact one stationary terminal S4b, and when the pedal 22 (see FIG. 1) is depressed, this movable contact piece is changed over to the other stationary terminal S4c. Between this stationary terminal S4c and the output end $b$ is connected a playback solenoid 35.

Connected across the solenoid 35 is a serial circuit consisting of a protective resistor R4 and a relay 36. One 36a of normally opened contact piece of the relay 36 is connected to one control input terminal 1 of the motor speed control circuit 25 through the resistors R2, R3, while the other contact piece 36b is connected to the other control input terminal 2 of the motor speed control circuit 25.

In FIG. 2, diodes D1 and D2 connected between respective both ends of the solenoids 34 and 35, respectively, are for the purpose of absorbing a reverse e.m.f. voltage.

The electric circuit of the embodiment shown in FIG. 2 has the foregoing construction.

The operation of this electric circuit will now be explained. First, the power source plug 12 is connected to the commercially used power source to turn the main switch S on. Then, the motor M is caused to rotate through the motor speed control circuit 25, and simultaneously the amplifier circuit 31 is made operative through the constant voltage circuit 30. Under this condition, however, power supply to the solenoid 35 is not made effective, and therefore the tape driving mechanism and the head 32 still remain in a condition ready for operation.

When, under this condition, the playback foot pedal 22 (see FIG. 1) is depressed to change over the foot switch S4, the movable contact piece of the switch S4 is changed over from one stationary terminal S4b to the other stationary terminal S4c to permit the power supply to the playback solenoid 35 and the relay 36. When this solenoid 35 is operated, the pinch roller is pressed, through the tape, against the capstan placed under rotation in accordance with the operation of the motor M. Therefore, the tape travel is started and at the same time the magnetic head 31 is allowed to abut on the travelling tape, whereby the magnetic tape-reproducing operation begins.

When the relay 36 is operated, both said contact pieces 36a, 36b are brought into contact with each other, whereby the resistors R2, R3 are connected to the control input terminals 1 and 2 of the motor speed control circuit 25 and the rotation speed of the motor M is automatically controlled to a specified value.

In this way, the transcriber 1 is changed over to its operative condition from its condition ready for operation by depressing the playback foot pedal 22, so that the content recorded in the tape can be heard through the magnetic reproducing head 32, amplifier circuit 31, and the loud-speaker 33 or earphone, whereby an operator, for example, a typist can perform her typewriting operation.

Where, under the above reproduction condition, the operator has missed hearing some parts of the reproduced sounds or wishes to rewind a small part of the tape for confirmation, she has only to depress the backspace foot pedal 23 (see FIG. 1) to change over the foot switch S3.

In the transcriber, the play operation or reproduction operation in the case of a usual tape recorder is called a "playback operation", and the review operation called a "backspace operation". Accordingly, to depress the backspace foot pedal 23 is to conduct the review operation in the usual tape recorder. This review operation, as well known, is different from what is called "rewinding operation" (REW) and means a tape rewinding operation performed at a lower speed than said REW.

When the pedal 23 is depressed to change over the switch S3, the movable contact piece of the switch S3 is changed over from one stationary terminal S3b to the other stationary terminal S3c.

As a result, supply of power to the playback solenoid 35 and the relay 36 is made ineffective and simultaneously supply of power to the tape rewinding solenoid 34 is made effective. When the solenoid 35 and relay 36 are made inoperative, the motor speed control circuit 25 comes to have no control input. Thus, the motor M starts to make a low speed rotation. On the other hand, when the solenoid 34 is made operative, the tape driving mode is changed over to the tape rewinding mode. Accordingly, the tape is rewound at low speed. Further, in this case, as seen from the circuit diagram shown in FIG. 2, even when the playback pedal 22 is kept depressed, depression of the backspace foot pedal 23 causes the backspace operation to be performed.

If, after the tape is rewound by a desired length, the pedal 23 regains to the normal position and only the pedal 22 is depressed, the transcriber 1 will at once be brought to a playback condition, whereby the operator can hear reproduced sounds of the rewound desired portion of the tape.

Where the tape is desired to travel at high speed, the operator has only to depress the tape high speed travel operation button (see FIG. 1). When this depression is effected, the tape high speed travel change-over switch S2 has its movable contact piece changed over from said other stationary terminal S2c to said one stationary terminal S2b. As a result, the solenoids 34, 35 and the relay 36 are made inoperative and the power source is connected directly to the motor M through the resistor R1. Accordingly, the motor M is controlled only in accordance with the resistance value of the resistor R1 to make a high speed rotation to take up or wind the tape. Since, at this time, neither the solenoid 34 nor the solenoid 35 is made operative, the head, pinch roller, etc. are not also made operative and only the taking-up or winding reel is rotated to wind the tape thereabout at high speed.

Next, where the tape is desired to be rewound, the operator has only to depress the tape rewinding operation button 13 (see FIG. 1). When this depression is carried out, the tape rewinding operation change-over interlocking switch pair S1 and S1' are changed over. Namely, the switch S1 has its movable contact piece changed over from said other stationary terminal S1c to said one stational terminal S1b, while the switch S1' has its movable contact piece changed over from one stationary terminal S1b' to said other stationary terminal S1c'. When the switch S1' is changed over, the solenoid 34 is made operative to change over the tape winding mode to the tape rewinding mode, and simultaneously the motor M is connected directly to the power source through the resistor R1 by change-over of the switch S1, whereby the motor M rotates at the same speed as at the time of the high speed tape travel. Accordingly, the tape is rewound at high speed.

The electric circuit of the embodiment shown in FIG. 2 operates in the above-mentioned manner.

Figure 3:
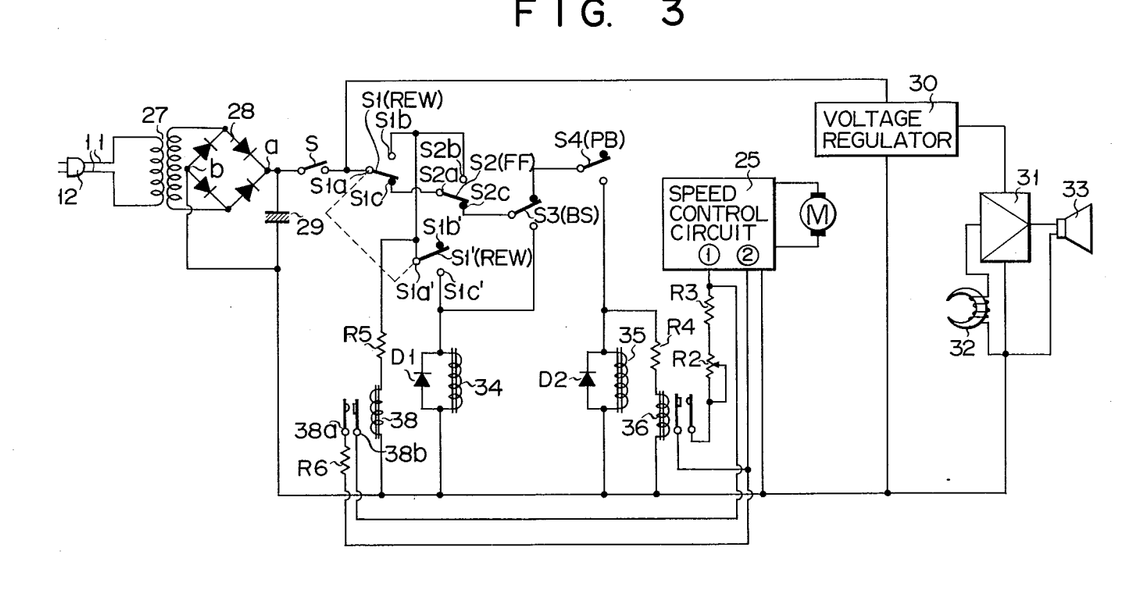
FIG. 3 is a circuit diagram showing the electric device according to another embodiment of the invention.

In the circuit example of FIG. 2, when the tape is allowed to travel at high speed and when the tape is rewound, the motor M is subject to high speed rotation by being connected directly to the power source without making the motor control circuit 25 operative. FIG. 3 shows a second embodiment wherein the high speed motor rotation at the time of the high speed tape travel and the tape rewinding is performed under the condition in which the motor speed control circuit 25 is made operative.

The circuit of the second embodiment is constructed such that the resistor R1 connected between the motor M and said one stationary terminals S1b, S2b of the switches S1, S2 in the electric circuit of FIG. 2 is omitted, and that, as shown in FIG. 3, a relay 38 is connected between the output end b of the power source and the movable contact piece terminal S1a' of the switch S1' through a protective resistor R5, and a normally opened movable contact piece 38a of the relay 38 is connected to the control input terminal 2 of the motor speed control circuit 25 through a motor speed setting resistor R6, while a normally opened movable contact piece 38b thereof is connected to the control input terminal 1 of the circuit 25. The remaining circuit construction is the same as that of the circuit of FIG. 2, and description thereof is omitted.

If construction is made as such, the relay 38 in the high speed tape travel operation based on the change-over of the switch S2 and in the tape rewinding operation based on the change-over of the switches S1, S1' will be made operative to cause its normally open contact pieces 38a, 38b to be closed thereby causing the resistor R6 to be connected to the control input terminals 1, 2 of the motor speed control circuit 25, so that the motor M is controlled to a specified rotational speed.

In the circuit example of FIG. 3, the motor speed in the high speed tape travel operation is made equal to that in the tape rewinding operation. Where the motor speeds in both cases are desired to differ from each other, the circuit construction has only to be made as shown in FIG. 4.

Figure 4:
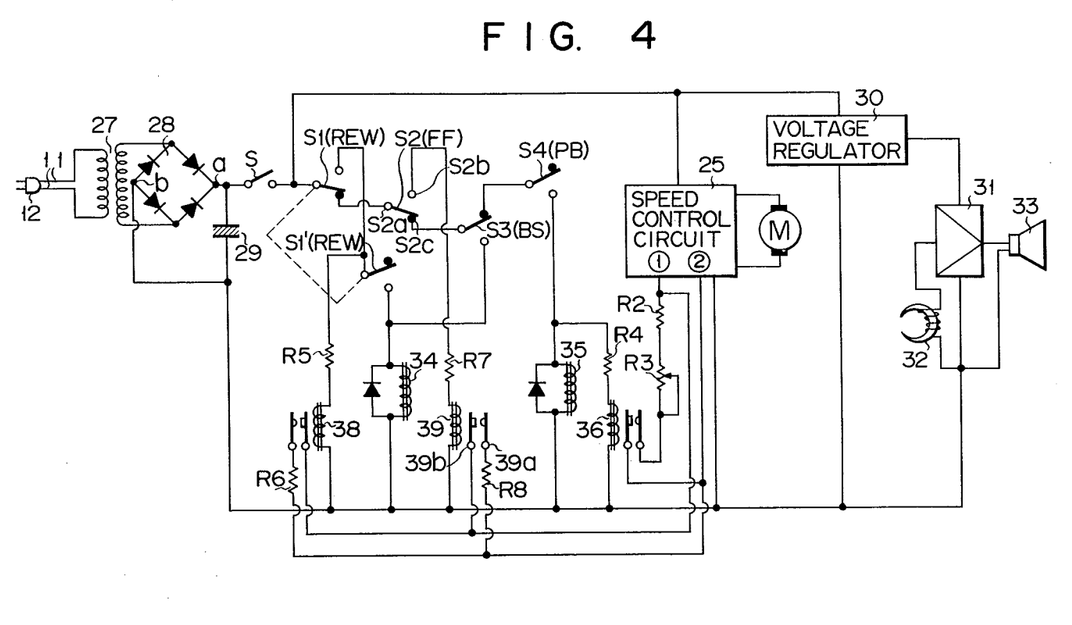
FIG. 4 is a circuit diagram showing the electric device according to still another embodiment of the invention.

An electric circuit of a third embodiment shown in FIG. 4 is constructed such that a relay 39 is further connected between the output end b of the power source and said one stationary terminal S2b of the high speed tape travel change-over switch S2 through a protective resistor R7, and a motor speed setting resistor R8 is connected between a normally opened contact piece 39a of the relay 39 and the control input terminal 2 of the motor speed control circuit 25, and the other normally opened contact piece 39b is connected to the control input terminal 1.

By constructing the circuit as shown in FIG. 4, the relay 39 in the high speed tape travel operation based on the change-over of the switch S2 is made operative to cause the resistor R8 to be connected to the control circuit 25, whereby the tape can be allowed to travel at a speed different from the rotational speed of the motor M at the time of rewinding the tape.

Figure 5:
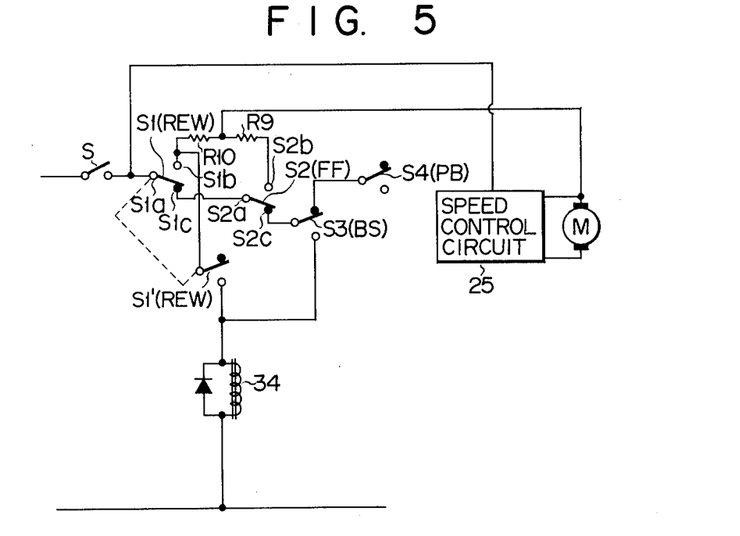
FIG. 5 is a circuit diagram showing a main part of the electric device according to a further embodiment of the invention.

In the circuit examples shown in FIGS. 3 and 4, use is made of the relay. FIG. 5 shows a fourth embodiment wherein the motor speeds both at the time of the high speed tape travel operation and at the time of the tape rewinding operation are readily made different without using the relays 38, 39 and yet utilizing the motor speed control circuit 25.

In the circuit of the fourth embodiment shown in FIG. 5, said one stationary terminal S2b of the switch S2 is connected directly to the motor M thorugh a motor speed setting resistor R9, and said one stationary terminal S1b of the switch S1 is also connected directly to the motor M through a motor speed setting resistor R10.

Also by constructing the circuit as shown in FIG. 5, the motor speeds in the high speed tape travel operation and in the tape rewinding operation can be allowed to differ from each other.

Figure 9:
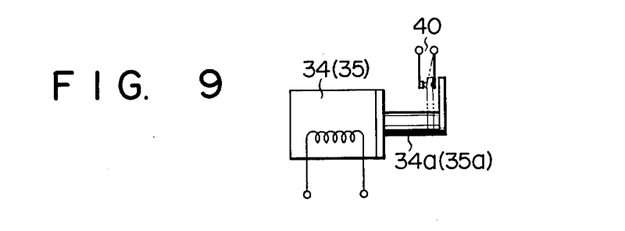
FIG. 9 shows an example of a switch on-off operation mechanism to be driven by a solenoid.

In the above-mentioned first to third embodiments shown in FIGS. 2, 3 and 4, the motor speed setting resistors are connected by using the relays 36, 38 and 39, respectively. But these resistors may be connected by closing a normally opened movable contact piece switch 40 by utilizing the movement of a plunger 34a (35a) of the solenoid 34 (35), as shown in FIG. 9.

Hereinafter, description is made, referring to FIGS. 6 and 7, of a fifth embodiment wherein the rotational speed of the motor, or the travel speed of the magnetic tape in the backspace operation is equalized with that in the tape rewinding operation, and a sixth embodiment wherein the rotational speed of the motor, on the travel speed of the magnetic tape in the former operation is made different from that in the latter operation, respectively. The corresponding parts and sections to those shown in FIGS. 1 to 5 are denoted by the same reference numerals.

Figure 6:
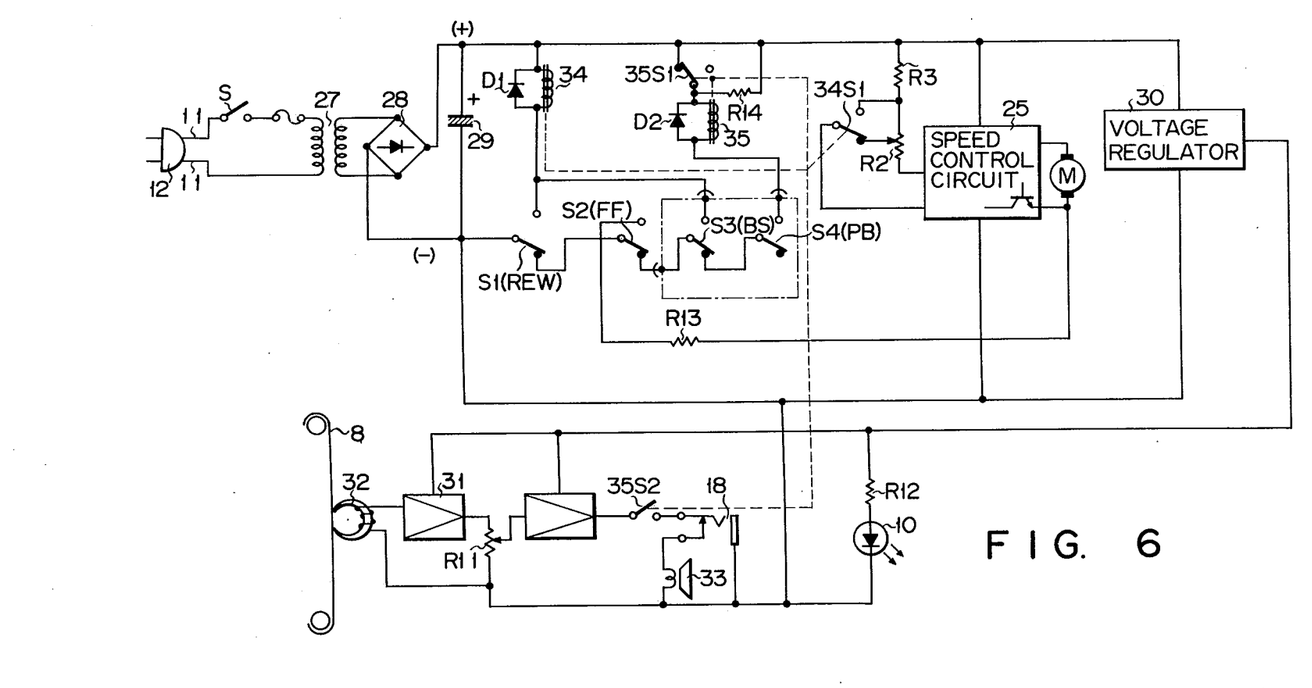
FIG. 6 is a circuit diagram showing the electric device according to a further embodiment of the invention.

In FIG. 6, if, even in case the main switch S is closed, the manually operable rewinding and high speed-travelling switches S1, S2, and the backspace and playback foot switches S3, S4 are located at their respective illustrated positions, a magnetic tape feed mechanism and a magnetic tape reproduction mechanism, of the transcriber 1 will be kept in a condition ready for operation. When, at this time, the typist operates the playback foot switch S4, the playback solenoid 35 is energized to open a switch 35S1 and close a switch 35S2. Simultaneously, the reproduction mechanism, though not shown, is set to its operative position. When the normally opened contact piece of the switch S4 is closed, a sufficiently large amount of current is first allowed to flow in the solenoid 35 through the switch 35S1 and from the solenoid 35 is produced a magnetic attractive force great enough to move the reproduction mechanism up to its operative position. Owing to the operation of the solenoid 35 the switch 35S1 is opened and then current flows in the solenoid 35 through a resistor R14, so that the amount of current flowing through the solenoid 35 is reduced. At this time, however, the reproduction mechanism has been sufficiently maintained in its operative position by the magnetic action of the solenoid 35 even in such a redused amount of current condition. Accordingly, the amount of heat generated from the solenoid 35 as a result of making effective supply of power to the motor becomes small to enable a reduction in load applied to the power transformer 27. In this way, the reproduction mechanism is kept at its reproducing position by the action of the solenoid 35, and simultaneously the switch 35S2 is closed also by the action of the solenoid 35, whereby the typist can transcribe while hearing the reproduced sounds from the loud-speaker 33. During this transcription, the tape speed can be controlled to a given value by adjusting the resistance value of the variable resistance R2.

When, during this playback operation, a necessity arises to perform the backspace operation, the typist depresses the foot pedal 23 of FIG. 1 to change over the backspace switch S3 to the normally opened contact side. Note here that even if, at this time, the foot pedal 22 is simultaneously depressed, the backspace operation will be conducted without hindrance. When the backspace S3 is changed over, the solenoid 35 is deenergized to permit the reproduction mechanism to return to its condition ready for operation, and simultaneously the solenoid 34 is energized to permit the tape feed mechanism to be displaced to the rewinding position from the position ready for operation or winding operation. When the solenoid 34 is energized, the switch 34S1 is changed over to the normally opened contact side, whereby the variable resistor R2 is so separated that only the stationary resistor R3 is connected to the motor speed control circuit 25. Thus, during the backspace operation, the tape speed is kept constant irrespective of the resistance value of the variable resistor R2.

Where, in the fifth embodiment of FIG. 6, the tape is desired to be rewound or desired to undergo the high speed travel, this rewinding or high speed travelling operation is carried out by manually operating the rewinding switch S1 or the high speed travel change-over switch S2. Namely, the rewinding operation is performed by changing over the switch S1 to the normally open contact side to energize the solenoid 34, while the high speed tape travel operation is performed by changing over the switch S2 to the normally opened contact side to cause the swtich S1 to be connected directly to the motor through the switch S1. In this way, in the case of the embodiment of FIG. 6, both at the time of backspace operation and at the time of rewinding operation, the solenoid 34 is energized to cause only the stationary resistor R3 to be connected to the motor speed control circuit 25, so that the tape travel speed is kept constant.

Figure 7:
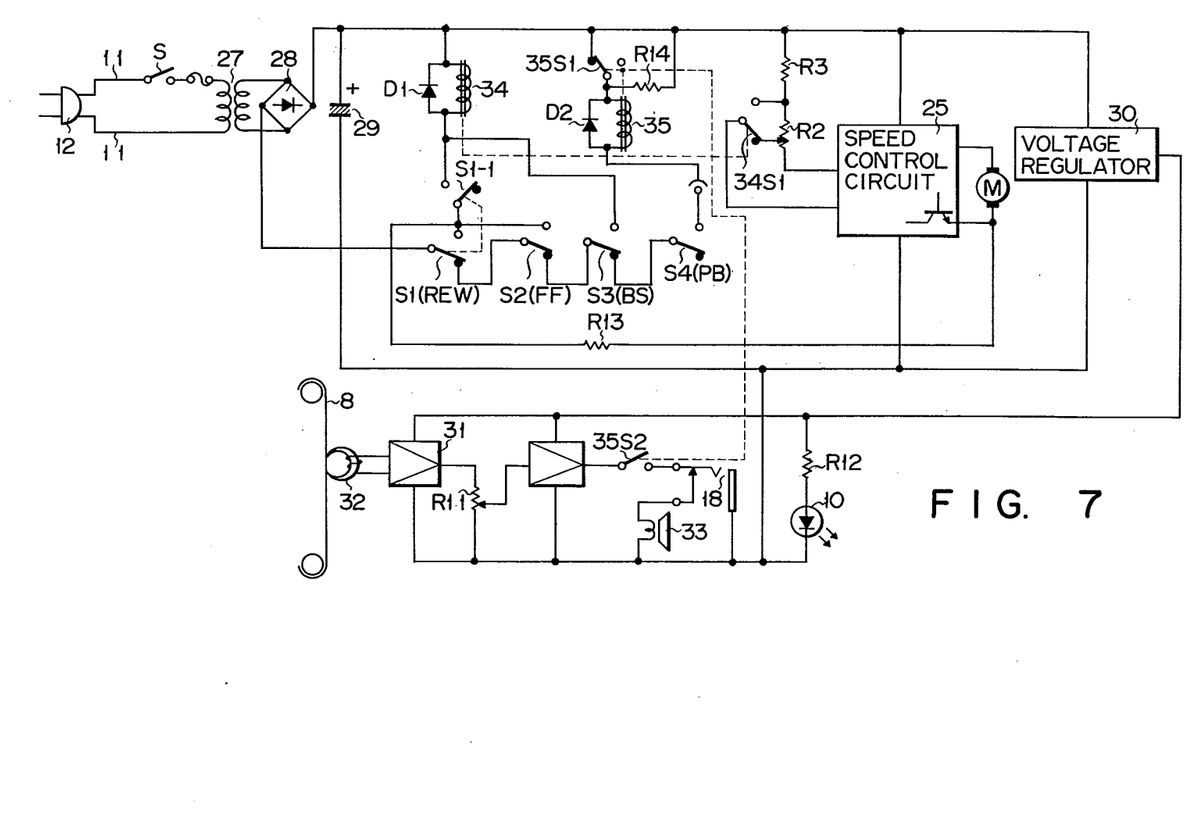
FIG. 7 is a circuit diagram showing the electric device according to a further embodiment of the invention.

In the sixth embodiment of FIG. 7, a switch S1-1 interlocked with the rewinding switch S1 is provided between the switch S1 and the solenoid 34. The normally opened contact side of the switch S1 is connected to one end of the motor through a resistor R13. In this embodiment, at the time of backspace operation, a negative side terminal of the power source is connected directly to one end of the motor and on the other hand the switch S1 is interlocked with the solenoid 34 to be changed over to the normally opened contact side, whereby the motor is rotated at a specified speed determined by the existence of the resistor R3. Further, at the time of rewinding operation, a negative side terminal of the power source is connected to the one end of the motor through the resistor R13. Therefore, even when the swtich 34S1 is changed over in interlocking relation with the solenoid 34, the motor is rotated at a speed different from that at the time of backspace operation. The operation of the remaining parts is the same as in the case of the embodiment of FIG. 6.

What we claim is:

1. An electric device for use in a transcriber, comprising a main switch turned on or off in interlocking relation with a mechanism for setting a magnetic tape feed means and magnetic tape reproduction means of the transcriber to a position where both means are ready to operate; a circuit for rewinding a magnetic tape at a specified speed, including a tape rewinding solenoid for moving said magnetic tape feed means to a rewinding position from said ready-for-operation position and a first switch having a first change-over contact connected to one end of a power source, a first normally closed contact and a first normally opened contact connected to the other end of said power source through said tape rewinding solenoid; a circuit for permitting said magnetic tape to run at a high speed by driving said magnetic tape feed means kept in said ready-for-operation position; a backspace circuit for energizing said tape rewinding solenoid to drive said magnetic tape feed means at a speed lower than the speed for the rewinding or high-speed running of said magnetic tape, said backspace circuit including a second switch having a second change-over contact connected to said first normally closed contact, a second normally closed contact and a second normally opened contact connected to said other end of said power source through said tape rewinding solenoid; a playback circuit including a playback solenoid for moving said magnetic tape feed means and magnetic tape reproduction means to respective playback positions from said ready-for-operation position and a third switch having a third change-over contact coupled to said one end of the power source through said second and first normally closed contacts and said first change-over contact, a third normally closed contact and a third normally opened contact connected to the other end of the power source through said playback solenoid; and a foot switch means for actuating said second and third switches by foot, whereby the first switch has the precedence over the second switch in operation and the second switch has the precedence over the third switch in operation.

2. An electric device according to claim 1, comprising a motor speed control circuit including a variable resistor, and means for connecting said variable resistor to said motor speed control circuit only when said tape rewinding solenoid is disabled.

3. An electric device according to claim 1, comprising an amplifier having an output, a loudspeaker and a normally opened switch adapted to be closed to connect said output of said amplifier to said loudspeaker when said playback solenoid is energized.

4. An electric device according to claim 1, comprising a normally closed switch adapted to be opened when said playback solenoid is energized, and a resistor connected between said playback solenoid and the other end of said power source.

5. An electric device according to claim 2, comprising a fixed resistor, said third normally opened contact being connected to an electric motor for feeding the magnetic tape through said fixed resistor.

6. An electric device according to claim 2, comprising a fixed resistor, said third normally opened contact being connected to said first normally opened contact and then connected to an electric motor for feeding the magnetic tape through said fixed resistor.

* * * * *